(12) United States Patent
Leonard

(10) Patent No.: US 7,270,192 B2
(45) Date of Patent: Sep. 18, 2007

(54) PORTABLE ADJUSTABLE HOOF SUPPORT STAND

(76) Inventor: Nancy Kay Leonard, P.O. Box 10043, Golden Valley, AZ (US) 86413-2043

( * ) Notice: Subject to any disclaimer, the term of this patent is extended or adjusted under 35 U.S.C. 154(b) by 44 days.

(21) Appl. No.: 11/290,392

(22) Filed: Nov. 30, 2005

(65) Prior Publication Data

US 2007/0119601 A1    May 31, 2007

(51) Int. Cl.
*A01L 11/00* (2006.01)

(52) U.S. Cl. ...................................................... 168/44

(58) Field of Classification Search ................. 168/44; 119/753, 755, 816, 814; 248/688, 407, 423
See application file for complete search history.

(56) References Cited

U.S. PATENT DOCUMENTS

| | | | |
|---|---|---|---|
| 284,873 A * | 9/1883 | Marsh ...................... 182/182.3 |
| 418,938 A * | 1/1890 | Bogusch ................... 182/182.3 |
| 443,346 A * | 12/1890 | Allen .......................... 168/44 |
| 457,345 A * | 8/1891 | Fox ............................. 168/44 |
| 1,035,734 A * | 8/1912 | Plamondon ................ 168/48.2 |
| 1,175,522 A * | 3/1916 | Horn .......................... 182/227 |
| 1,547,225 A * | 7/1925 | Marks ..................... 182/182.3 |
| 3,696,869 A * | 10/1972 | Anding ........................ 168/44 |
| 4,167,216 A * | 9/1979 | Beaston ....................... 168/44 |
| 5,213,061 A | 5/1993 | Zito |
| 5,979,562 A | 11/1999 | Hammonds |
| 6,848,512 B2 * | 2/2005 | Keeler ......................... 168/44 |
| 7,086,192 B2 * | 8/2006 | Deros ............................. 42/94 |

\* cited by examiner

*Primary Examiner*—Son T. Nguyen
(74) *Attorney, Agent, or Firm*—Galasso & Associates, LLP; Raymond M. Galasso

(57) ABSTRACT

A portable and adjustable hoof support stand is provided having a large tapered base, a hoof rest having adjustable side restraints, and a height adjustment means by which the height of the hoof rest may be adjusted vertically relative to the ground.

7 Claims, 5 Drawing Sheets

PORTABLE ADJUSTABLE HOOF SUPPORT STAND

FIELD OF THE DISCLOSURE

The disclosures made herein relate generally to the field of tools that are useful in the shoeing of hoofed animals, and in particular to portable adjustable hoof stands specifically designed to position and support an animal's hoof during animal care work such as shoeing by a farrier or hoof inspection by a veterinarian and care of an animal's hoof disease issues.

BACKGROUND

The present invention relates to a device for the support of and holding in position the leg of a horse or other hoofed animal for care of the animal, for example, while a farrier removes and/or replaces a horse shoe or trims a hoof.

The horse's hoof is comprised of a layer of horn material or material similar to a human fingernail that grows from the base of the foot and protects the front of the foot. The hoof consists of a hardened outer region and a more sensitive middle area. As in a human fingernail, the outer hoof is devoid of nerve endings and therefore the animal does not experience pain when a horseshoe using appropriately sized and positioned nails is nailed to the hoof. Domesticated horses are shod with a horseshoe sometimes formed from steel or iron material, sometimes with a thin resilient or rubber material embedded to provide cushioning. Horseshoes have been applied for centuries with the purpose of protecting the horse's hoof and allowing the horse to gallop and bear weight more comfortably. Horseshoes need to be replaced from time to time. The American Farrier's Association lists a typical time interval between reshoeing of between 6 to 10 weeks. Many times in this process the hoofs may need to be trimmed back to provide the horse a more natural way of going and because the outer portion of the hoof is always growing. When a horseshoe has been removed, if the horse's hoofs are undamaged and healthy, a replacement horseshoe might be fitted the first time. In other cases however, the horseshoe may need to be modified to place the horsenail holes in a better location for attachment to the hoof's outer region or to modify the shape of the shoe to more closely match the shape and condition of the horse's hoofs. For such cases a farrier often brings a portable forge to the location where the horse is to be shod and reworks the shoe on site. A horse shoe, once in condition for attachment to the hoof, is secured to the hoof of a horse by a farrier driving horsenails through openings in the horse shoe into the outer region of the horse's hoof. This is done, as one might expect, by the use of a specialized hammer which a farrier swings and drives against the head of the horsenail to drive the nail into the horse's hoof. As can be understood from this general discussion, reshoeing a horse or other hoofed animal can be an uncomfortable and stressful time, both for the animal and for the farrier.

Roger Clark, a farrier, claims that shoeing a heavy horse is hard work, but ill-trained horses are much harder. Farrier's commonly shoe the rear hoof of a horse by standing behind the horse with the farrier's back to the horse, then raising the foot of the horse between the farrier's legs and cradling the leg and hoof on the farrier's legs. This is uncomfortable for the horse which must now stand on three legs and is uncomfortable for the farrier who must work in a hunched over position on the foot of a horse that may be ill behaved and that may be less than pleased about what is about to take place. As can be understood, this can be a dangerous task if the horse is uncomfortable and becomes restless.

One limitation of the conventional means of shoeing a horse by the farrier hunching over and supporting the horse's foot between his legs is that the shoeing task is uncomfortable to the horse and to the farrier.

Another limitation of the conventional means of shoeing a horse is the issue of safety. With the farrier having his back to the horse and the opportunity for the horse to misbehave during the task, an injury can occur to the farrier, an injury the farrier may not see coming.

Therefore, a device which supports the horse's foot and hoof in position during shoeing, that permits the farrier to stand unencumbered without the need to support and hold the horse's foot in position, a device that provides comfort to the animal during the shoeing process and reduces the chance of injury to a farrier would be useful and novel.

SUMMARY OF THE DISCLOSURE

Accordingly, embodiments of the inventive disclosures made herein comprise an adjustable portable hoof stand as applied in the shoeing and routine animal health care of hoofed animals.

In a portable adjustable hoof stand in accordance with the present inventive disclosure, the stand has a large tapered base with angled side panels or legs. The side panels or legs taper outward to provide a more stable footing for the stand and make the stand more difficult to tip over when in use. The base is preferably open inside to reduce weight and make it easier to transport. Due to the sides being tapered outwards providing a wider base footprint on the ground, the base is positionally stable and does not require additional supportive means when in use.

Located above the tapered base, the hoof stand provides a cushioned hoof rest area to receive and support an animal's leg or hoof portion of the leg. At opposing sides of the hoof rest are located adjustable side restraints. The side restraints allow the width of the hoof receiving portion of the hoof rest to be adjusted to accommodate animal hooves of various dimensions, while providing an adjustment means to limit the side to side movement of the hoof on the stand during hoof inspection or during the task of shoeing the animal.

In a portable adjustable hoof stand in accordance with the present inventive disclosure the height of the hoof rest relative to the ground is adjustable during setup and in use. Hoof rest height adjustment is provided by a height adjustment means located between the hoof rest and the tapered base of the hoof stand. In one embodiment of the adjustable hoof support stand, the height adjustment member comprises a post and a tubular receiving member, the receiving member sized to slidably and telescopically receive the post. The post is provided with a series of holes there-through along its length. As the post's position is adjusted inside and relative to the tubular receiving member, at various positions holes in the post align with holes in the tubular receiving member and a locking pin may be inserted through the aligned holes to fix the position of the post in the receiving member. The holes are positioned frequently enough in close enough spacing to provide a multitude of selectable height adjustment options.

Accordingly, it is an objective of the inventive disclosures made herein to provide a hoof stand that is portable, easy for a farrier to carry from location to location in his work.

It is another objective of the inventive disclosure made herein to provide a hoof stand that is adjustable to suit the comfort of the animal and the farrier or veterinarian working with the animal. Shoeing a horse can be a trying and tiring process. It is usually necessary for the farrier to bend the horse's leg, raise it upwards slightly, brace the horse's leg between the knees so that the hoof is in a ready position for work, and then bend or hunch forward to work on the hoof. Unfortunately the farrier's back and shoulder muscles can become tired and painful from unnaturally bending over to work in such conditions.

It is yet another objective of the inventive disclosure made herein to provide a hoof stand that is comfortable for the animal. The stand is designed with a large angled base to resist tipping from forces induced by the farrier or movement of the animal during its use. The stand is equipped with a padded hoof rest area for the comfort of the animal to provide comfort to the animal and reduce restlessness.

It is a further objective of the inventive disclosure made herein to provide a hoof stand that offers increased safety for the farrier, allowing the farrier to face and observe the animal on which he is working. This is accomplished by providing support to the animal's hoof and thereby removing the need to support the animals hoof between the farrier's or veterinarian's legs during the shoeing or hoof work procedure.

It is still another objective of the inventive disclosure made herein to provide a hoof stand that is manufacturable at low cost, has rugged construction for long life, and therefore provides the manufacturer with a low development cost providing a lower price to the end user along with providing valuable aid in working with hoofed animals.

These and other objects of the invention made herein will become readily apparent upon further review of the following specification and associated drawings.

BRIEF DESCRIPTION OF THE DRAWINGS

The drawings show a form of the invention that is presently preferred, however the invention is not limited to the precise arrangement shown in the drawings.

DETAILED DESCRIPTION OF THE DRAWINGS

In preparation for explaining the details of the present inventive disclosure, it is to be understood by the reader that the invention is not limited to the presented details of the construction, materials and construction details as illustrated in the accompanying drawings, as the invention concepts are clearly capable of other embodiments and of being practiced and realized in various ways by applying the disclosure presented herein.

Figure 1:
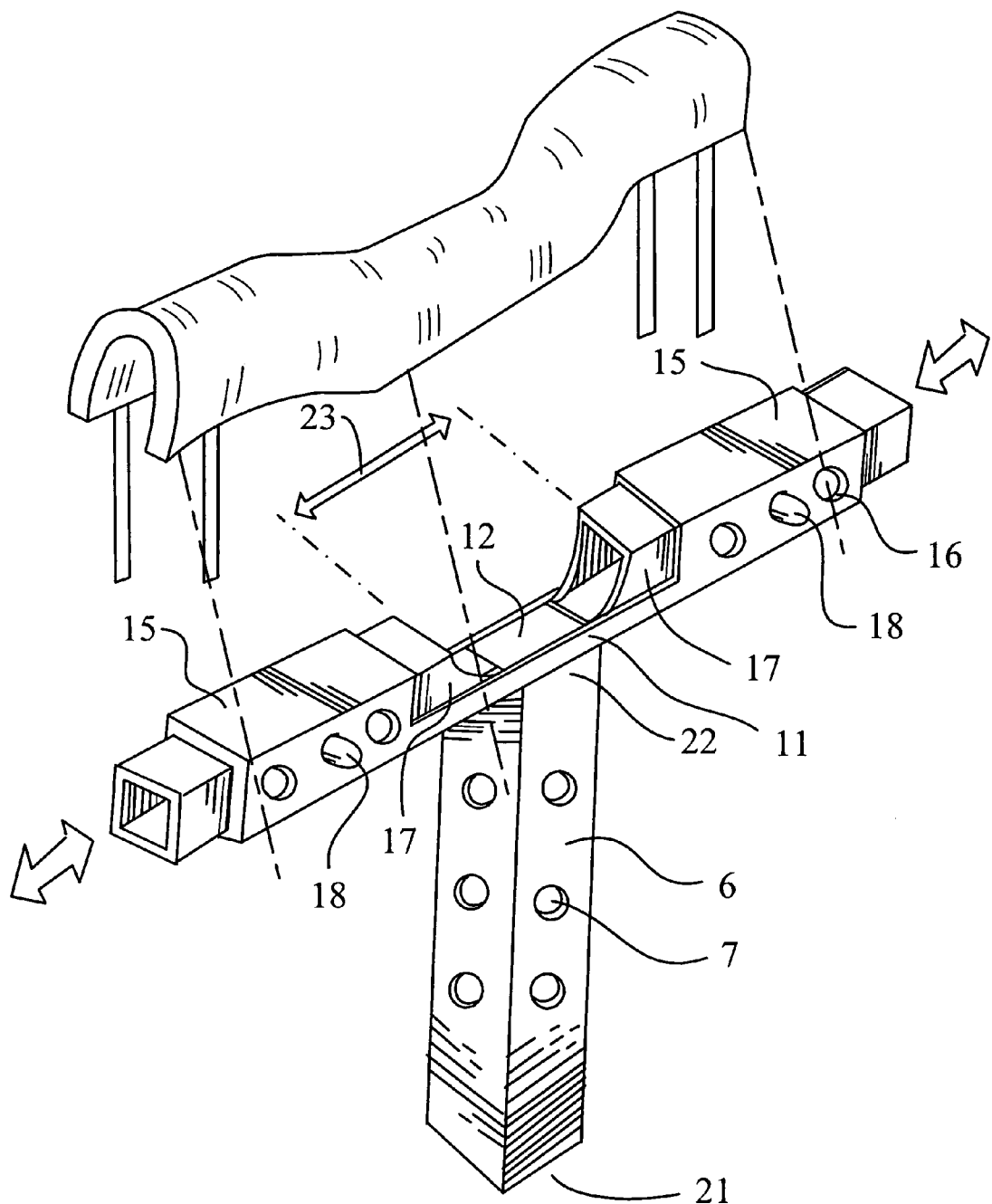
FIG. 1 presents a perspective view of portions of one embodiment of a height adjustment member and the hoof support member in accordance with the inventive disclosures herein.

FIG. 1 depicts an upper removable vertical height adjustable portion of an adjustable hoof stand in accordance with an embodiment of the inventive disclosures made herein. The upper removable portion comprises an elongated vertical height adjustment member 6, having a lower end 21 and an opposing upper end 22. The elongated vertical height adjustment member is provided with one or more of holes spaces along a major axis of a face of the vertical height adjustment member. Holes or voids continue completely through the vertical height adjustment member 6 from one face to a parallel offset face of the height adjustment member, so that a pin may be inserted clear through the vertical height adjustment member. In another embodiment, the vertical height adjustment member may comprise a tubular member having a rectangular cross section and a hollow center, this as depicted in FIG. 1. The vertical height adjustment member is not limited to the use of a tubular member, and may comprise tubular solid members, for example, formed from a variety of materials such as aluminum, iron, as well as PVC or various molded plastics. A hoof support member 11 is secured to the upper end 22 of the elongated vertical height adjustment member 6. The hoof support member comprises a hoof receiving support portion 12 located between opposing end of the hoof support member. Two elongated tubular arms 15 are secured in an opposing facing relationship at opposite ends of the hoof receiving portion 12 of the hoof support member 11. Each tubular arm 15 has a plurality of adjustment holes 16 spaced along a face along a major axis of the tubular arm. Two sliding hoof restraint members 17, one for each tubular arm, are provided. The sliding hoof restraint members are slidably received into and supportively retained by the tubular arms. Each sliding hoof restraint member having at least one spring pin 18 secured thereto, the spring pin sized, positioned and configured to protrude through an adjustment hole of the tubular arm and thereby fix the position of the hoof restraint member in relationship to the tubular arm. The hoof gap 23 between the facing hoof restraint members 17 is adjusted by depressing the spring pin 18 and sliding the hoof restraint member along the tubular arm to align with another adjustment hole. By repositioning the hoof restraint member along the tubular arms, the hoof gap 23 between the hoof restraint members is adjustable so as to accommodate a variety of animal hoof widths and restrain the hoof from sideways movement during the farrier's work on the animal's hoof. The adjustable height stand together with the hoof rest and adjustable hoof side restraint members used as an aid by the owner of a hoofed animal, or the veterinarian or a farrier during the care of the hoofed animal, wherein the leg of the animal is lifted onto the hoof rest, and wherein the side restraints and hoof rest elevation above the ground have been adjusted to minimize discomfort and resulting uncooperative behavior of the animal due to discomfort during the hoof inspection and possible hoof or shoe work by a farrier. Implied, intended but not explicitly shown in FIG. 1 is a padding member placed upon or over the hoof stand hoof rest and side restraint members to provide a cushioned surface for the animal's leg to rest upon.

Figure 2:
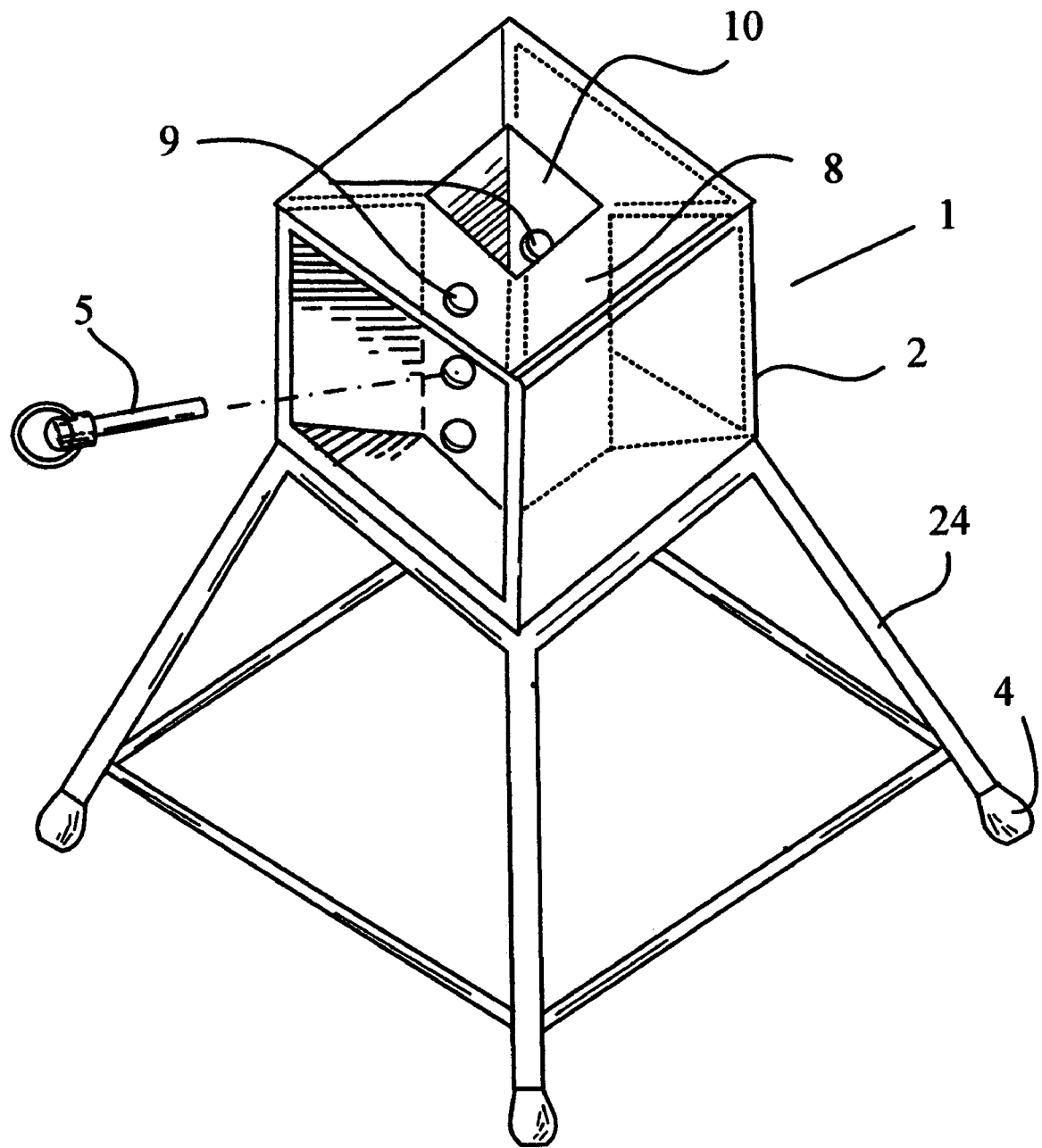
FIG. 2 is a perspective view of one embodiment of an adjustable hoof support stand in accordance with the inventive disclosures herein. The observer is positioned to the side above the stand for better understanding.

Referring now to FIG. 2, the tapered stool-like support base 1 has a top member 2 and a base member 24 having a plurality of sides. The upper portion of the sides are secured to the top member, and the lower portion of the sides are configured for resting and supporting the stand on the ground. The lower end of the sides 4 are angled outwards so as to increase the stability of the base against tipping over. The sides may comprise solid outer side walls with a hollow interior, or any variety of configurations including also stool like legs with open sides as depicted in FIG. 2. Sides which are substantially solid are advantageous as they reduce the change of an animal entangling its leg in between the legs of the base. The top member has a vertical height adjustment lower tubular member 8 having a receiving end 10 and having a plurality of pairs of holes 9 spaced along facing sides, each hole in a pair sharing a common radial axis, the lower member sized to telescopically, slidably and supportively receive the lower end 21 of upper height adjustment member 6, as shown earlier in FIG. 1 in the receiving end 10 of the lower member. The holes in the lower and upper members are sized and positioned so that as the upper member is telescopically adjusted in the lower member the holes in the upper and lower members align at various positions so as to receive the removable latching pin 5 there-through, the pin fixing the relative telescopic position of the upper member relative to the lower member, the latching pin being removable so as to allow for further telescopic height adjustment of the hoof receiving portion of the hoof support above the ground, so as to fit the geometry, height and size of the animal and for the comfort of the farrier in his work.

Figure 3:
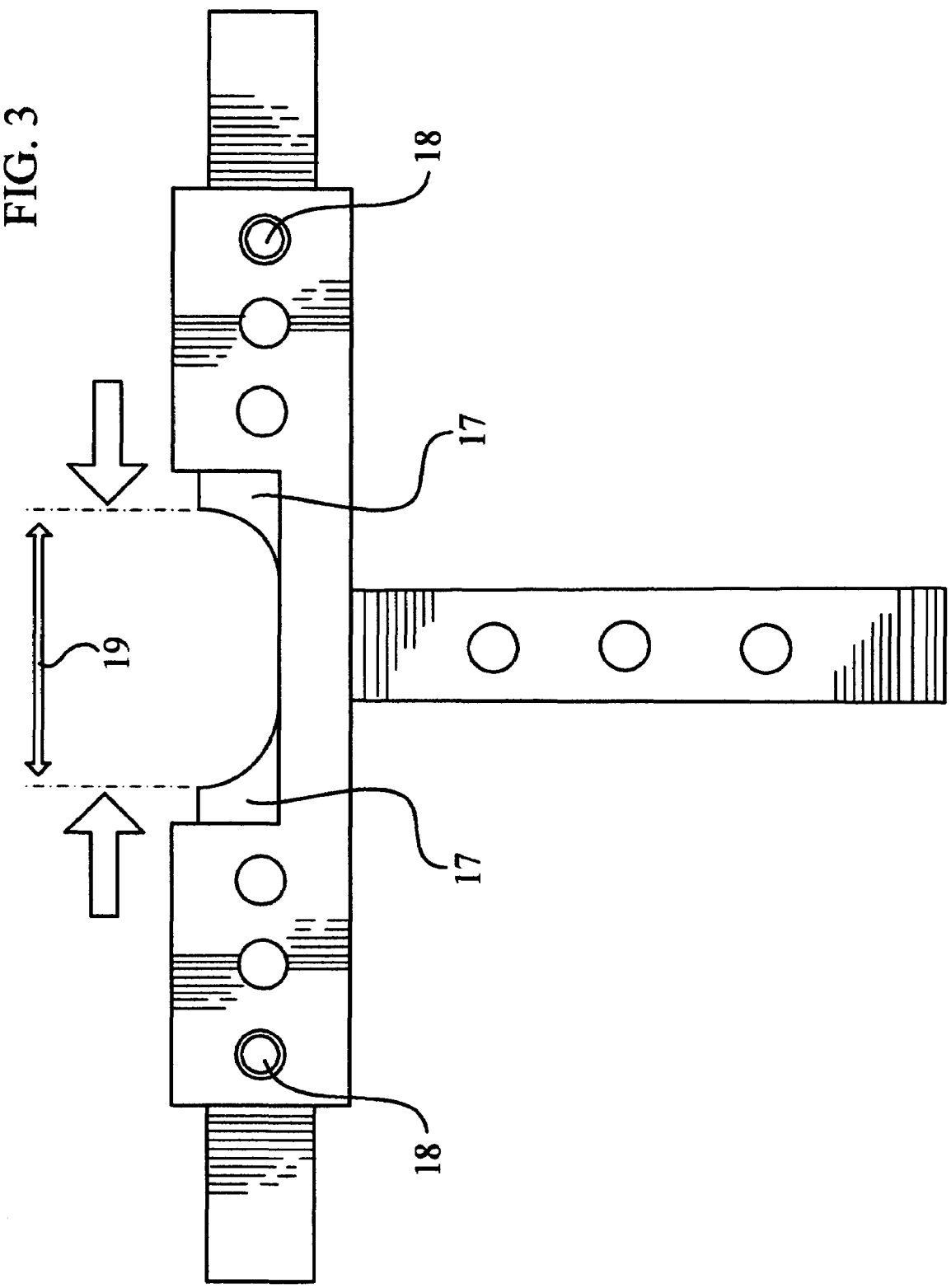
FIG. 3, FIG. 4 and FIG. 5 present front views, directly normal to major component faces, of one embodiment of a height adjustment member and hoof support member in accordance with the inventive disclosures herein. The views illustrate the adjustable hoof rest gap feature of the hoof rest side restraints.
Figure 4:
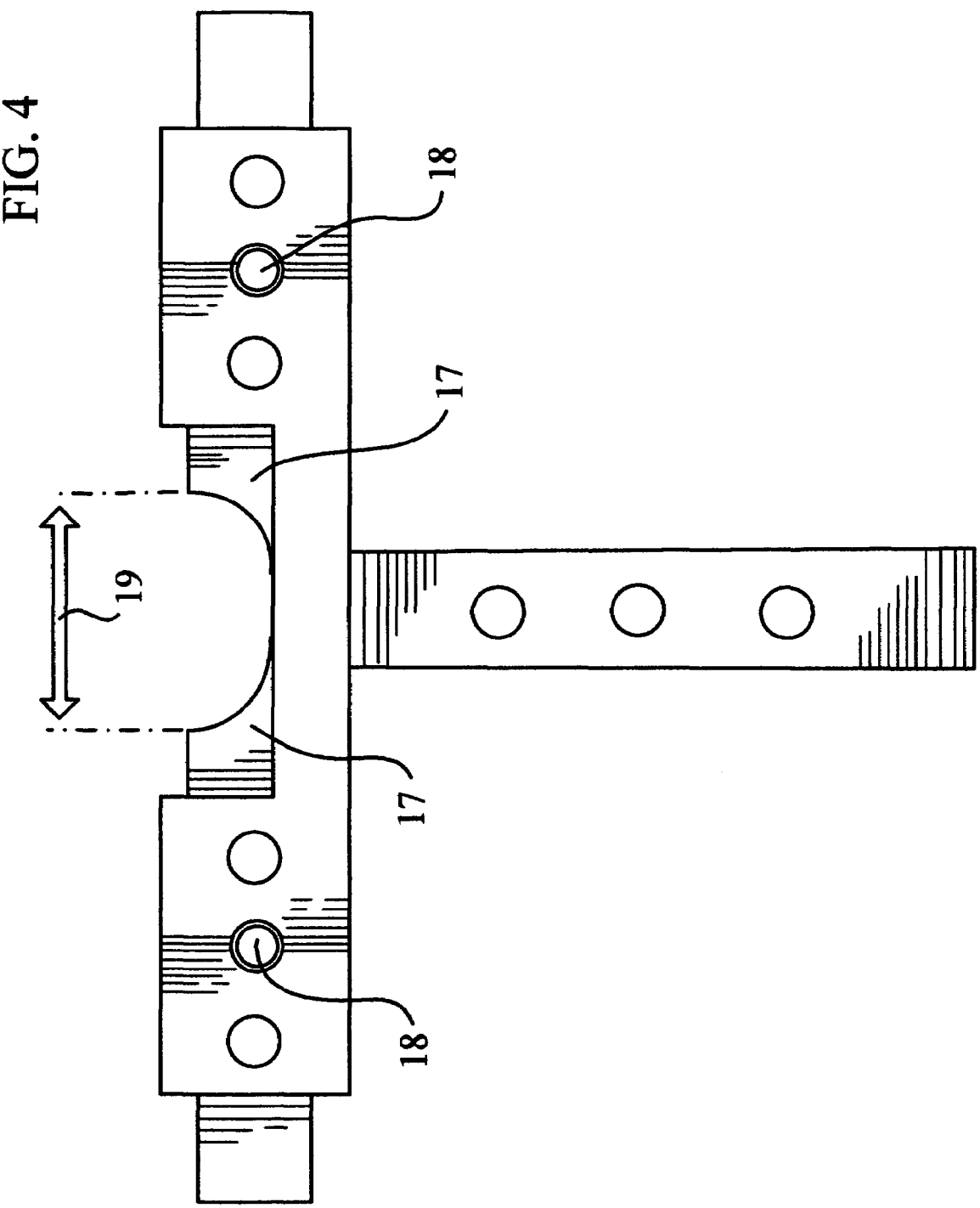
Figure 5:
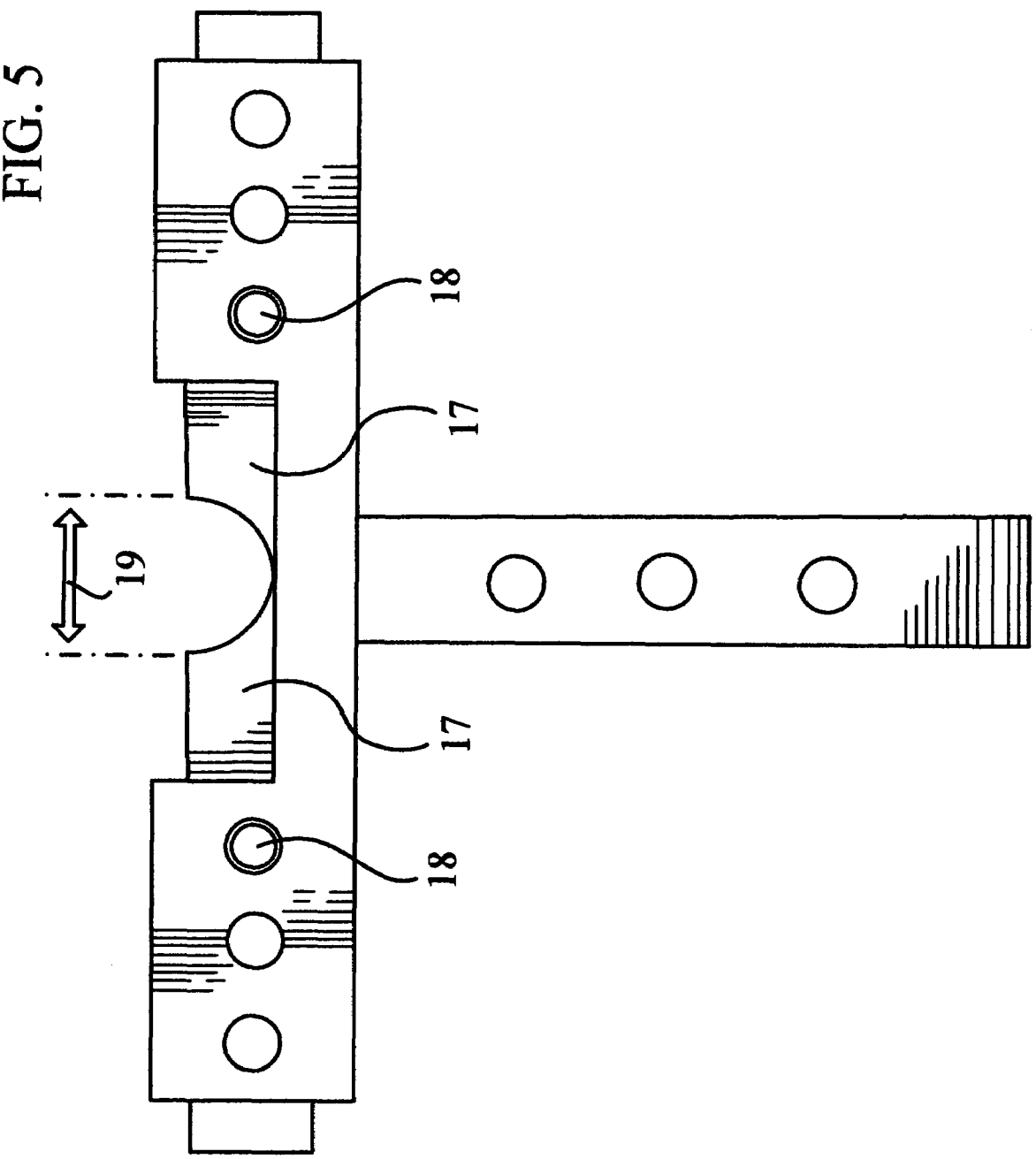

Referring now to FIGS. 3 through 5. FIGS. 3 through 5 depict a side view of the upper removable, vertical height adjustable portion of an adjustable hoof stand in accordance with an embodiment of the inventive disclosures made herein, particularly illustrating the use of the spring pins 18 together with the sliding hoof restraint members 17 in adjusting the hoof gap 19 between the hoof restraint members.

The discussed construction, illustrations and sequence of operation is for one embodiment of the invention, but is in no way limiting to other embodiments. The operating modes may be changed and enhanced without deviating from the intention of this inventive disclosure.

In the preceding detailed description, reference has been made to the accompanying drawings that form a part hereof, and in which are shown by way of illustration specific embodiments in which the invention may be practiced. These embodiments and certain variants thereof have been described in sufficient detail to enable those skilled in the art to practice the invention. It is to be understood that other suitable embodiments may be utilized and that logical, material, mechanical, software and electrical changes may be made without departing from the spirit or scope of the invention. To avoid unnecessary detail, the description omits certain information known to those skilled in the art. The preceding detailed description is, therefore, not intended to be limited to the specific forms set forth herein, but on the contrary, it is intended to cover such alternatives, modifications, and equivalents, as can be reasonably included within the spirit and scope of the appended claims.

What is claimed is:

1. A farrier's adjustable hoof support stand comprising:
   a tapered stool-like supportive base member having a top member and a plurality of sides, the sides having an upper end secured to the top member, the sides having a lower end for resting on ground, wherein the sides are angled outwards at the lower end so as to increase the stability of the base against tipping over;
   a vertical height adjustment member comprising:
      a removable latching pin;
      an elongated upper height adjustment member having one or more pairs of holes, a major axis and at least two facing sides, each hole in a pair in an axially aligned spaced relationship in facing sides providing a clean bore through the upper height adjust member, the hole pairs spaced at intervals along the major axis; and
      an elongated tubular lower member secured to the stool-like base top member, the lower member having a plurality of pairs of holes spaced along facing sides, each hole in a pair sharing a common radial axis, the lower member sized to telescopically, slidably and supportively receive the upper height adjustment member through a receiving end of the lower member, the holes in the lower and upper members sized and positioned so that as the upper member is telescopically adjusted in the lower member at least one pair of holes in the upper and lower members axially align at one or more sliding positions so as to receive the latching pin through the aligned holes, the pin supportively fixing the relative telescopic position of the upper member relative to the lower member, the latching pin being removable so as to allow for further telescopic adjustment; and
   a hoof support member secured to an upper end of the upper height adjustment member, the hoof support member having:
      a hoof receiving support portion having two opposing ends;
      two elongated tubular arms having a plurality of adjustment holes, each tubular arm secured to opposing ends of the hoof receiving support in facing relationship;
      two sliding hoof restraint members, one for each arm, slidably received into the tubular arm, each hoof restraint member having a spring pin secured thereto, the spring pin sized and configured to protrude through the adjustment hole in the arm and thereby fix the position of the hoof restraint relative to the arm, wherein a gap between the hoof restraint members is adjustable so as to accommodate a variety of animal hoof widths and restraint the hoof against sideways movement during the farrier's work, and wherein the height of the hoof support member above the ground is adjustable through the vertical height adjustment member to accommodate a comfortable work height for both the farrier and the animal.

2. The farrier's adjustable hoof stand of claim 1 further comprising one or more cushion members secured to the hoof receiving support portion, the cushion member providing a resilient comfortable surface to the animal's hoof.

3. The farrier's adjustable hoof stand of claim 2 wherein the cushion member comprises one or more foam filled fabric cushions draped on and over the hoof receiving support portion.

4. The farrier's adjustable hoof stand of claim 2 wherein the cushion member comprises resilient rubber pads, one pad secured to an upper face of the hoof receiving portion and wherein each hoof restraint member has a resilient rubber pad secured to a face nearest the hoof receiving portion, the rubber pads for cushioning an animals leg while resting in the hoof stand.

5. The farrier's adjustable hoof stand of claim 2 wherein the sides of the stool-like base comprise tubular legs with the base having substantially open sides.

6. The farrier's adjustable hoof stand of claim 2 wherein the sides of the stool-like base comprise substantially closed sides so as to prevent an animal's leg from entangling in the base between the legs of the base.

7. The farrier's adjustable hoof stand of claim 2 wherein the stool-like stand member comprises aluminum, the height adjustment member comprises tubular aluminum; and the tubular arms comprises tubular aluminum.

* * * * *